United States Patent [19]

Guigonis

[11] Patent Number: 4,506,023

[45] Date of Patent: Mar. 19, 1985

[54] MOULDABLE REFRACTORY COMPOSITION BASED ON PARTIALLY STABILIZED ZIRCONIA AND ON AN ALUMINOUS HYDRAULIC BINDER, ITS PREPARATION AND MOULDINGS MANUFACTURED FROM THIS COMPOSITION

[75] Inventor: Jacques Guigonis, Entraigues-sur-Sorgues, France

[73] Assignee: Societe Europeenne des Produits Refractaires, Courbevoie, France

[21] Appl. No.: 534,504

[22] Filed: Sep. 21, 1983

[30] Foreign Application Priority Data

Sep. 22, 1982 [FR] France ............................ 82 15942

[51] Int. Cl.³ ............................................. C04B 35/48
[52] U.S. Cl. .................................... 501/104; 501/105; 501/124; 106/104
[58] Field of Search ............... 501/103, 104, 105, 124; 106/104

[56] References Cited

U.S. PATENT DOCUMENTS 3,533,815 10/1970 Baldwin ............................. 501/105

FOREIGN PATENT DOCUMENTS

| | | | |
|---|---|---|---|
| 1179852 | 10/1964 | Fed. Rep. of Germany | 501/103 |
| 1593602 | 6/1970 | France | 501/103 |
| 2229662 | 12/1974 | France | 501/104 |
| 1222894 | 2/1971 | United Kingdom | 501/104 |

*Primary Examiner*—James Poer
*Attorney, Agent, or Firm*—Watson, Cole, Grindle & Watson

[57] ABSTRACT

A refractory composition for use in the manufacture of pipes for casting steel, the composition consisting essentially of: (a) from 96 to 98% by weight of zirconia which is partially stabilized by CaO, MgO or $Y_2O_3$, at least 90% of which has a particle size of between 0.1 and 10 μm, and (b) from 2 to 4% by weight of an aluminous hydraulic binder, this composition having the following overall chemical analysis: 1.4 to 3.2% by weight of $Al_2O_3$, 3.7 to 4.6% by weight of CaO, or 0.36 to 1.15% by weight of CaO plus 2.7 to 3.5% by weight of MgO, or 0.36 to 1.15% by weight of CaO plus 5.36 to 8.80% of $Y_2O_3$, less than 1% by weight of $SiO_2+Na_2O+Fe_2O_3+TiO_2$ taken together, and $ZrO_2$ to make up to 100%.

4 Claims, No Drawings

MOULDABLE REFRACTORY COMPOSITION BASED ON PARTIALLY STABILIZED ZIRCONIA AND ON AN ALUMINOUS HYDRAULIC BINDER, ITS PREPARATION AND MOULDINGS MANUFACTURED FROM THIS COMPOSITION

BACKGROUND OF THE INVENTION

The invention relates to a refractory composition based on partially stabilized zirconia and on an aluminous hydraulic binder, which can easily be formed to the desired shape by casting in a mould, followed, after setting, by sintering at high temperature. The invention also relates to a process for the preparation of this composition and to the mouldings manufactured from the noted composition.

It is common to manufacture certain refractory mouldings, such as nozzles for the continuous casting of steel, from compositions based on stabilized zirconia. However, these known compositions are not entirely satisfactory from the points of view of their mechanical and physical properties, in particular because of a rather high open porosity of the order of 20%.

SUMMARY OF THE INVENTION

The object of the invention is to provide a new mouldable refractory composition which makes it possible to produce refractory mouldings of improved quality and having, in particular, an increased density, a reduced open porosity, a good resistance to thermal shock and advantageous mechanical properties.

More precisely, the invention relates to a refractory composition consisting essentially of:

(a) 96 to 98% by weight of zirconia partially stabilised by calcium oxide, magnesium oxide or yttrium oxide, at least 90% of which has a particle size of between 0.1 and 10 $\mu$m, and (b) 2 to 4% by weight of an aluminous hydraulic binder, this composition also having the following overall chemical analysis (within the limits of precision of the analysis):

1.4 to 3.2% b weight of $Al_2O_3$, 3.7 to 4.6% by weight of CaO, or 0.36 to 1.15% by weight of CaO plus 2.7 to 3.5% by weight of MgO, or 0.36 to 1.15% by weight of CaO plus 5.36 to 8.80% by weight of $Y_2O_3$, less than 1% by weight of $SiO_2+Na_2O+Fe_2O_3+TiO_2$ taken together, and $ZrO_2$ to make up to 100%.

The invention also relates to a process for the preparation of this composition, characterized in that it comprises the following steps:

(I) intimately mixing a stabilizing amount of powdered calcium carbonate, magnesium carbonate or yttrium carbonate, calculated in the form of oxide, chosen from amongst the following:

(i) 2.7 to 4.3% by weight of CaO, (ii) 2.7 to 3.5% by weight of MgO and (iii) 5.36 to 8.80% by weight of $Y_2O_3$, this powder having a particle size of 0.1 to 40 $\mu$m, with an amount, to make up to 100%, of a powdered monoclinic zirconia, at least 90% of which consists of particles having a size of 0.1 to 10 $\mu$m, (II) calcining the mixture obtained at a temperature within the range 1000° to 1200° C. for at least one hour, so as to decompose the carbonate to the corresponding oxide and partially to convert the monoclinic zirconia to cubic zirconia, and (III) intimately mixing 96 to 98% by weight of the partially stabilized zirconia obtained under (II) with 2 to 4% by weight of an aluminous hydraulic binder, and grinding the whole mixture until a powder is obtained, at least 90% of which has a particle size within the range of 0.1 to 10 $\mu$m. Calcium oxide constitutes the preferred stabilizer. The preferred amounts of stabilising oxide are, by weight, 3.42% of CaO, 3.1% of MgO and 7% of $Y_2O_3$.

The composition of the invention is easy to process. It suffices to suspend it in water (15 to 20 parts of water per 100 parts by weight of composition) at the same time as a small amount, preferably of between about 0.05 and 1% relative to the weight of the composition, of a dispersing agent making it possible to reduce the amount of water required. This suspending operation can be carried out in any commercial mixer. The resulting product can then be cast in a mould of the desired shape, this mould preferably being subjected to vibrations, during and after filling, in order to remove the air bubbles. It is possible to use, for example, a mould made of metal, wood or a polymeric material such as polystyrene, an epoxy resin, polyvinyl chloride or an elastomer. The use of the plaster moulds, normally employed for slip casting, must be avoided. If desired, the casting can be carried out in vacuo in order to effect degassing. The mould is then preferably introduced into a climatically controlled enclosure or an autoclave in order to accelerate the hardening of the product contained in the mould. A mould provided with heating means, such as electrical heating elements, could also be used. The moulding is then released from the mould, dried and then fired (sintered) at a temperature of between 1550° and 1700° C., preferably of about 1600° C., for about 2 to 10 hours, preferably for about 5 hours.

During the firing, a minor proportion (not determinable) of the aluminous binder reacts with the monoclinic zirconia to form an additional amount of cubic zirconia, while a major proportion forms an intercrystalline phase with the impurities in the initial powdered zirconia. The mouldings obtained have a microtexture formed of grains (15 to 70 $\mu$m) of cubic zirconia, surrounded by smaller grains (0.3 to 15 $\mu$m) of monoclinic zirconia, and of an intercrystalline phase. In these mouldings, the cubic zirconia represents about 60 to 70% of the total zirconia. These mouldings also have a high density of more than 4930 kg/m³ and a low open porosity of 3.6 to 9%.

These characteristics are very advantageous because it is well known that refractory products must have the lowest possible open porosity in order to resist the various liquid or gaseous attacking agents to which they are subjected.

The compositions of the invention can be used to manufacture mouldings of simple or complicated shape, such as bricks, bars, nozzles for casting steel, thread guides, crucibles and the like. It is also possible to produce tubes by simple casting or by extrusion, and also tubes with thin walls (for example of 2 to 5 mm) by casting, vibration and centrifugation.

The following non-limiting examples, which describe the manufacture of nozzles for casting steel, are given in order to illustrate the invention:

EXAMPLE 1

The following were used as starting materials:

an industrial powdered monoclinic zirconia manufactured by Societe Europeenne Des Produits Refractaires of Entraigues-sur-Sorges, France and having the following chemical analysis by weight: $ZrO_2$ 98.5%—$SiO_2$=0.5%—$Na_2O$=0.2%—$Al_2O_3$=0.1%—$TiO_2$=0.1%—CaO=0.05%—MgO=0.03% and $Fe_2O_3$=0.05%; in addition, this powder has a specific surface area of about 2300 $m^2$/kg and at least 90% thereof consists of particles having a size of 0.1 to 10 $\mu m$ with a median diameter of 3.7 to 4.4 $\mu m$, depending on the batch; no particle is larger then 40 $\mu m$;

calcium carbonate manufactured by CARLO ERBA in the form of a heavy powder having a bulk density of 400 to 600 kg/$m^3$, a specific surface area of 2300 $m^2$/kg and a particle size of 0.1 to 40 $\mu m$ with a median diameter of 4.6 $\mu m$, and containing at least 98.5% by weight of $CaCO_3$. In its place, it would also be possible to use calcium carbonate manufactured by OMYA in the form of a "hydrocarb" powder having a bulk density of 800 kg/$m^3$, a specific surface area of 7000 $m^2$/kg and a particle size of 0.1 to 10 $\mu m$ with a median diameter of 5 $\mu m$, and containing 99.75% of $CaCO_3$. These two calcium carbonates give mouldings having similar properties;

as the aluminous binder, "SECAR 70" cement having the following chemical analysis by weight: $Al_2O_3$=70.5%—CaO=28.7%—$SiO_2$=0.35%—$Fe_2O_3$=0.1%—MgO=0.2% and $Na_2O$=0.35%, or "ALCOA CA 25" cement having the following chemical analysis by weight: $Al^2O_3$=79%—CaO=18%—$SiO_2$=0.2%—$Fe_2O_3$=0.3%—MgO=0.4% and $Na_2O$=0.5%; and as the dispersing agent, ACRYLON ®A 10 sold by PROTEX. In its place, it would also be possible to use, inter alia, GALORYL ®PT 268L sold by Compagnie Francaise de Produits Industriels.

96.58 parts by weight of the above-mentioned industrial powered monoclinic zirconia are mixed dry, in a ball mill, for 2 hours, with 6.1 parts by weight of CARLO ERBA calcium carbonate (corresponding to 3.42 parts by weight of CaO). The resulting mixture is calcined at 1200° C. for 5 hours. After the mixture has cooled to ambient temperature, 96 parts by weight thereof are mixed dry, in a ball mill, for 2 hours, with 4 parts by weight of "SECAR 70", aluminous cement. 100 parts by weight of the powder obtained are suspended in 16–18 parts by weight of tap water to which 0.1 part by weight of ACRYLON ®A 10 dispersant has been added, the whole being agitated in a blade mixer. The resulting suspension is then cast into a metal mould, which is vibrated for about 1 minute. The filled mould be placed in a climatically controlled enclosure (65° C., relative humidity of 40–50%) for about 15–20 minutes in order to harden the product. After this time, the moulding is released from the mould, put back in the enclosure and dried at 110° C. in the conventional way. Finally, it is sintered by firing at 1600° C., under an oxidising atmosphere, according to the following program:

| | |
|---|---|
| heating by 25° C./hour from 20 to 800° C. i.e. | 31.2 hours |
| heating by 40° C./hour from 800 to 1000° C. i.e. | 5.0 hours |
| heating by 25° C./hour from 1000 to 1600° C. i.e. | 24.0 hours |
| holding at 1600° C. for | 5.0 hours |
| cooling by 25° C./hour from 1600 to 940° C. i.e. | 26.4 hours |
| cooling by 10° C./hour from 940 to 880° C. i.e. | 6.0 hours |
| holding at 880° C. for | 5.0 hours |
| cooling by 10° C./hour from 880 to 800° C. i e. | 8.0 hours |
| cooling by 40° C./hour from 800 to 20° C. i.e. | 19.5 hours |
| TOTAL: | 130.1 hours |

The nozzles obtained according to the invention were tested in a continuous casting installation casting silicon-killed steel, and were shown to have a longer life than the nozzles most widely used at the present time (nozzles manufactured from a chamotte having a particle size ranging up to 300 $\mu m$, and from fines consisting of a mixture of monoclinic zirconia and calcium oxide having a density of 4770 kg/$m^3$, a coarse structure and a high open porosity of the order of 14.5%). Thus, by the fourth casting ladle (=1600° C.), the nozzles of the prior art were already corroded, and from the fifth casting ladle, only the nozzles of the invention were not only in perfect condition, in general terms, but also did not disturb the jet and did not therefore require unclogging with oxygen. The blast pipes of the invention have a density of 5,030 kg/$m^3$, an open porosity of 5–7%, a total porosity of 9–11% and a microtexture formed of grains of cubic zirconia of the order of 20 $\mu m$, surrounded by small grains of monoclinic zirconia of the order of 5 $\mu m$, and of an intercrystalline phase. Crystallographic analysis shows the following approximate proportions: cubic zirconia ~60–70%, monoclinic zirconia ~25–35%, intercrystalline phase ~5%. The intercrystalline phase is formed of the calcium aluminate from the hydraulic binder and of the impurities contained in the powdered zirconia.

It should be noted that, if the sintering temperature is raised, the size of the zirconia grains tends to increase and the mechanical properties tend to deteriorate, as shown in Table I. This table also shows the exceptional crushing strength properties of the products of the invention.

EXAMPLES 2 TO 7 ACCORDING TO THE INVENTION AND EXAMPLES A TO I OUTSIDE THE INVENTION

Nozzles are prepared, in a manner similar to that described in Example 1, starting from the compositions indicated in the attached Table II, which also summarises the data relating to Example 1.

The SECAR 50 cement and the "molten" cement used in Examples F to I had the following composition, in % by weight:

| | | |
|---|---|---|
| SECAR 50: | $Al_2O_3$: 50.5 | FeO: 1.0 |
| | CaO: 36.3 | Fe: 0.1 |
| | $SiO_2$: 6.9 | $TiO_2$: 1.95 |
| | $Fe_2O_3$: 2.35 | MgO: 0.1 |
| "MOLTEN" CEMENT: | $Al^2O_3$: 39 | FeO: 4.0 |
| | CaO: 38.5 | $TiO_2$: 2.5 |
| | $SiO_2$: 4.5 | MgO: 0.6 |
| | $Fe_2O_3$: 12.0 | $Na_2O$: 0.1 |

These two cements do not give good results, probably because of their relatively low $Al_2O_3$ content and their relatively high CaO and $SiO_2$ contents, which affect the composition of the intercrystalline phase.

The thermal shock resistance test consisted in heating the nozzles for 15 minutes at 1400° C. and then placing them for 15 minutes, at ambient temperature, on a 5 mm thick metal plate. It is then observed whether the product changes, cracks or bursts. The treatment is repeated.

The mouldings were graded from 1 to 4, the products graded 1 or 2 were considered as good, the products graded 3 were considered as average and the products graded 4 (bursting of the moulding in the 1st cycle) were considered as poor.

It should be noted that the good products satisfy the relationship:

$$1.09 < \frac{\text{density}}{1000 \text{ CaO}} < 1.44.$$

It is self-evident that the embodiments described are only examples and that they could be modified, in particular by the substitution of technical equivalents, without thereby exceeding the scope of the invention.

TABLE I

| Sintering temperature in °C. | 1,600° C. | 1,650° C. | 1,700° C. |
|---|---|---|---|
| Density | 5,000 kg/m³ | 5,060 kg/m³ | 5,000 kg/m³ |
| Open porosity in % | 6.6 | 5.6 | 5 |
| Total porosity in % | 10.9 | 9.8 | 10.9 |
| Breaking modulus N/mm², | | | |
| at 20° C. | 120.8 | 87.8 | 76.3 |
| at 1,340° C. | 80.2 | 58.6 | 46.4 |
| Crushing strength, N/mm² | | | |
| at 20° C. | 476.6 | 442.7 | 428.9 |
| at 600° C. | 499.2 | 491.4 | 471.4 |
| at 900° C. | 505.2 | 487.1 | 474.9 |
| at 1,200° C. | 471.4 | 399.4 | 338.5 |
| at 1,500° C. | 94.1 | 81.4 | 95.0 |
| Post-variation in dimensions after 12 hours at 1,600° C., in % of initial length | −0.035 | +0.05 | +0.3 |

TABLE II

| EXAMPLE | Hydraulic binder Nature | Hydraulic binder Content in % | CaO content calculated in % Total | CaO content calculated in % ZrO₂/CaO mixture | CaO content calculated in % Cement | ZrO₂ Content | Al₂O₃ Content | SiO₂ Content | Density D | Open porosity in % | Thermal shock classifacation | D/1000 CaO |
|---|---|---|---|---|---|---|---|---|---|---|---|---|
| 1 | SECAR | 4 | 4.43 | 3.28 | 1.15 | 92.75 | 2.82 | — | 5,030 | 4.1 | 1 | 1.13 |
| 2 | 70 | 3 | 4.18 | 3.32 | 0.86 | 93.71 | 2.11 | — | 5,100 | 3.6 | 1 | 1.22 |
| 3 | | 3 | 4.55 | 3.69 | 0.86 | 93.34 | 2.11 | — | 5,120 | 5.5 | 2 | 1.12 |
| 4 | | 2 | 4.55 | 3.98 | 0.57 | 94.04 | 1.41 | — | 5,110 | 3.8 | 2 | 1.12 |
| A | | 3 | [4.80] | 3.94 | 0.86 | 93.09 | 2.11 | — | 5,040 | 4.0 | 3 | 1.05 |
| B | | 4 | [5.29] | 4.14 | 1.15 | 91.89 | 2.82 | — | [5,130] | 3.8 | 3 | 0.97 |
| C | | 4 | [8.81] | 7.66 | 1.15 | 88.37 | 2.82 | — | 4,850 | 0.8 | 4 | 0.55 |
| 5 | CA 25 | 2 | 3.71 | 3.35 | 0.36 | 94.71 | 1.58 | — | 5,040 | 7.1 | 3 | 1.35 |
| 6 | | 4 | 4.0 | 3.28 | 0.72 | 92.84 | 3.16 | — | 4,930 | 9.0 | 2 | 1.23 |
| 7 | | 2 | 4.09 | 3.73 | 0.36 | 94.33 | 1.58 | — | 4,970 | 6.1 | 3 | 1.21 |
| D | | 1 | [3.56] | 3.38 | 0.18 | 95.65 | 0.79 | — | [5,150] | 4.9 | 3 | 1.44 |
| E | | 4 | [4.86] | 4.14 | 0.72 | 91.98 | 3.16 | — | 5,060 | 7.0 | 4 | 1.04 |
| F | SECAR | 2 | 4.46 | 3.73 | 0.73 | 94.26 | [1.01] | 0.14 | [4,890] | 1.7 | 4 | 1.09 |
| G | 50 | 4 | [5.12] | 3.66 | 1.46 | 92.33 | 2.02 | 0.28 | 5,000 | [0.9] | 4 | 0.97 |
| H | "MOLTEN" | 2 | 4.50 | 3.73 | 0.77 | 94.27 | [0.78] | 0.09 | [4,910] | [2.1] | 4 | 1.09 |
| I | CEMENT | 4 | [5.2] | 3.66 | 1.54 | 92.34 | 1.56 | 0.18 | 4,930 | 1.1 | 4 | 0.94 |

[ ] = values outside the prescribed limits; 1-2 = good; 3 = average; 4 = poor.

I claim:

1. Refractory composition consisting essentially of:
   (a) 96 to 98% by weight of zirconia partially stabilised by calcium oxide, magnesium oxide or yttrium oxide, at least 90% of which has a particle size of between 0.1 and 10 μm, and
   (b) 2 to 4% by weight of an aluminous hydraulic binder, this composition also having the following overall chemical analysis (within the limits of precision of the analysis):

1.4 to 3.2% by weight of $Al_2O_3$,
   3.7 to 4.6% by weight of CaO, or 0.36 to 1.15% by weight of CaO plus 2.7 to 3.5% by wight of MgO, or 0.36 to 1.15% by weight of CaO plus 5.36 to 8.80% by weight of $Y_2O_3$,
   less than 1% by weight of $SiO_2 + Na_2O + Fe_2O_3 + TiO_2$ taken together,
   and $ZrO_2$ to make up to 100%.

2. Refractory moulding having a microtexture formed of grains of cubic zirconia having a size of 15 to 70 μm, surrounded by grains of monoclinic zirconia having a size of 0.3 to 15 μm, and of an intercrystalline phase, the cubic zirconia representing about 60 to 70% of the total zirconia in crystallographic analysis, and this moulding having a density of more than 4,930 kg/m³ satisfying the relationship 1.09<(density/1000 (CaO content))<1.44, and a low open porosity of 3.6 to 9%, said moulding being obtained by casting, in a mould, a refractory composition, suspended in water, and then, after this composition has set, by sintering the moulded composition at a temperature within the range of 1550° to 1700° C., said refractory composition consisting essentially of
   (a) 96 to 98% by weight of zirconia partially stabilized by calcium oxide, magnesium oxide or yttrium oxide, at least 90% of which has a particle size of between 0.1 and 10 μm, and
   (b) 2 to 4% by wight of an aluminous hydraulic binder, this composition also having the following overall chemical analysis (within the limits of precision of the analysis):

1.4 to 3.2% by weight of $Al_2O_3$,
   3.7 to 4.6% by weight of CaO, or 0.36 to 1.15% by weight of CaO plus 2.7 to 3.5% by weight of MgO, or 0.36 to 1.15% by weight of CaO plus 5.36 to 8.80% by weight of $Y_2O_3$,
   less than 1% by weight of $SiO_2 + Na_2O + Fe_2O_3 + TiO_2$ taken together,
   and $ZrO_2$ to make up to 100%.

3. Refractory moulding according to claim 2 characterised in that it is in the form of a nozzle for casting steel.

4. Process for the preparation of a refractory composition consisting essentially of:
   (a) 96 to 98% by weight of zirconia partially stabilized by calcium oxide, magnesium oxide or yttrium oxide, at least 90% of which has a particle size of between 0.1 and 10 μm, and (b) 2 to 4% by weight of an aluminous hydraulic binder, this composition also having the following overall chemical analysis (within the limits of precision of the analysis):

1.4 to 3.2% by weight of $Al_2O_3$, 3.7 to 4.6% by weight of CaO, or 0.36 to 1.15% by weight of CaO plus 2.7 to 3.5% by weight of MgO, or 0.36 to 1.15% by weight of CaO plus 5.36 to 8.80% by weight of $Y_2O_3$, less than 1% by weight of $SiO_2+Na_2O+Fe_2O_3+TiO_2$ taken together, and $ZrO_2$ to make up to 100%, said process comprising the steps of:

(I) intimately mixing a stabilizing amount of powdered calcium carbonate, magnesium carbonate or yttrium carbonate, calculated in the form of oxide, chosen from amongst the following:

(i) 2.7 to 4.3% by weight of CaO, (ii) 2.7 to 3.5% by weight of MgO, and (iii) 5.36 to 8.80% by weight of $Y_2O_3$, this powder having a particle size of 0.1 to 40 μm, with an amount, to make up to 100%, of a powdered monoclinic zirconia, at least 90% of which consists of particles having a size of 0.1 to 10 μm, (II) calcining the mixture obtained at a temperature within the range 1000° to 1200° C. for at least one hour, so as to decompose the carbonate to the corresponding oxide and partially to convert the monoclinic zirconia to cubic zirconia, and (III) intimately mixing 96 to 98% by weight of the partially stabilized zirconia obtained under (II) with 2 to 4% by weight of an aluminous hydraulic binder, and grinding the whole mixture until a powder is obtained, at least 90% of which has a particle size within the range of 0.1 to 10 μm.

* * * * *